United States Patent [19]

Nyborg

[11] 3,895,574

[45] July 22, 1975

[54] APPARATUS FOR FEEDING, PRINTING AND STACKING ARTICLES

[75] Inventor: Ralph A. Nyborg, Naperville, Ill.

[73] Assignee: Maran Manufacturing Corporation, Pompano Beach, Fla.

[22] Filed: Aug. 17, 1973

[21] Appl. No.: 389,360

[52] U.S. Cl. ............... 101/37; 101/240; 214/6 BA; 214/8.5 K; 221/223; 221/251; 271/129
[51] Int. Cl. ... B41f 17/26; B65h 3/32; B65a 57/30
[58] Field of Search ............ 101/35, 36, 101/37, 101/37, 43, 44, 240; 221/221, 223, 251, 297, 298; 214/8.5 K, 6 BA

[56] References Cited
UNITED STATES PATENTS

| 2,317,408 | 4/1943 | Schneider | 214/8.5 K UX |
|---|---|---|---|
| 3,282,202 | 11/1966 | Groth et al. | 101/37 |
| 3,387,720 | 6/1968 | Wilkin | 214/6 BA |
| 3,447,282 | 6/1969 | Mumma | 221/221 X |
| 3,512,333 | 5/1970 | Mobley | 214/6 BA X |
| 3,519,144 | 7/1970 | Calistrat | 214/6 BA |
| 3,595,164 | 7/1971 | Hovekamp | 101/37 |
| 3,601,282 | 8/1971 | Vogel | 221/251 |
| 3,628,693 | 12/1971 | Moore | 221/251 X |
| 3,664,521 | 5/1972 | Feher | 221/221 X |
| 3,795,346 | 3/1974 | Roberts et al. | 221/223 |

Primary Examiner—Clifford D. Crowder
Attorney, Agent, or Firm—Roy E. Petherbridge; Robert L. Lindgren; Edward D. Gilhooly

[57] ABSTRACT

Apparatus for conveying articles for imprinting indicia thereon, such as egg cartons, bags, paperboard, etc., which includes electrically controlled pneumatically actuated structure for delivering such articles one at a time onto conveyor means which advances the articles into position to be printed and then delivers them to an electrically controlled pneumatically actuated stacker that functions to stack the articles from the bottom.

8 Claims, 13 Drawing Figures

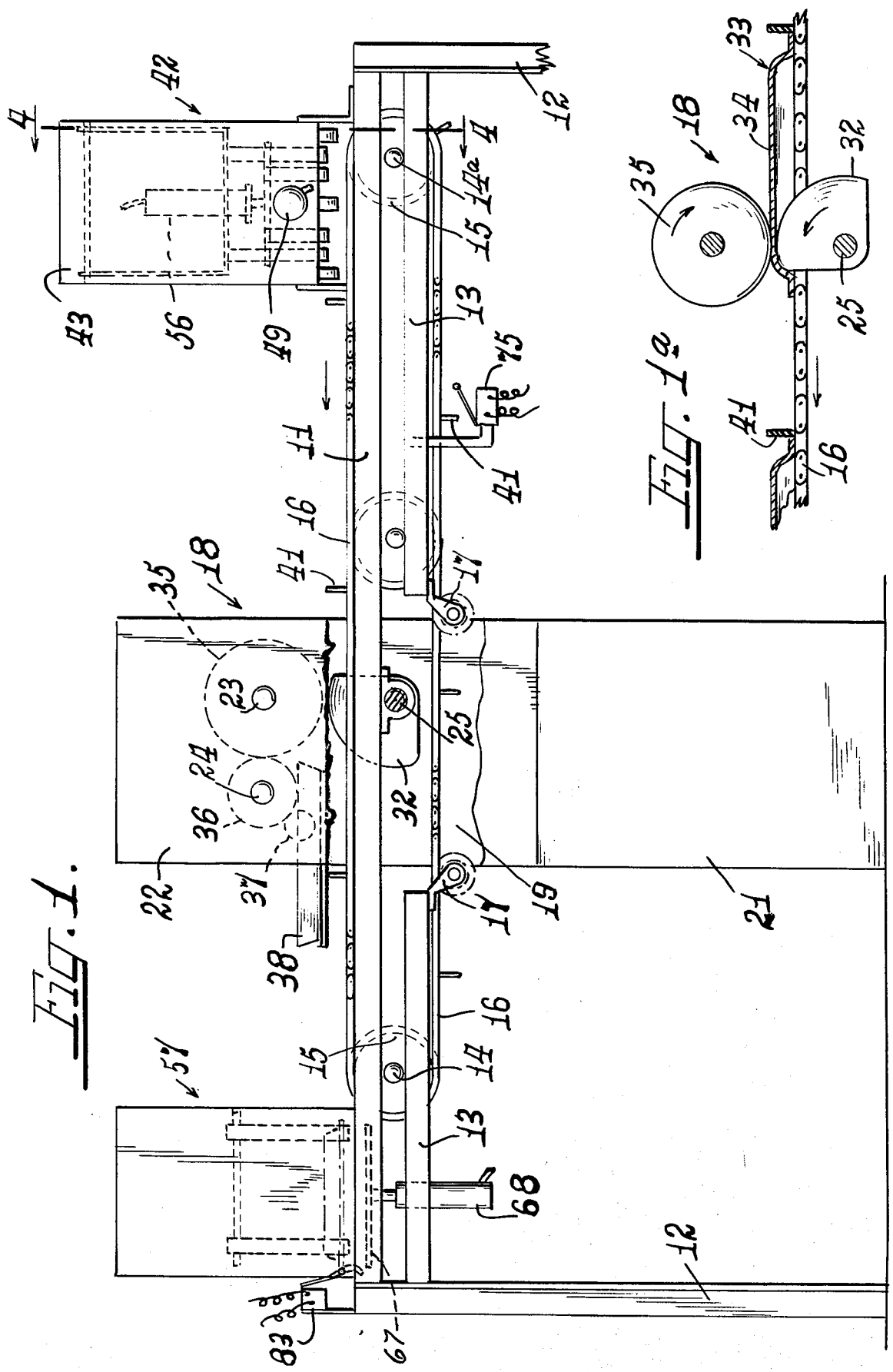

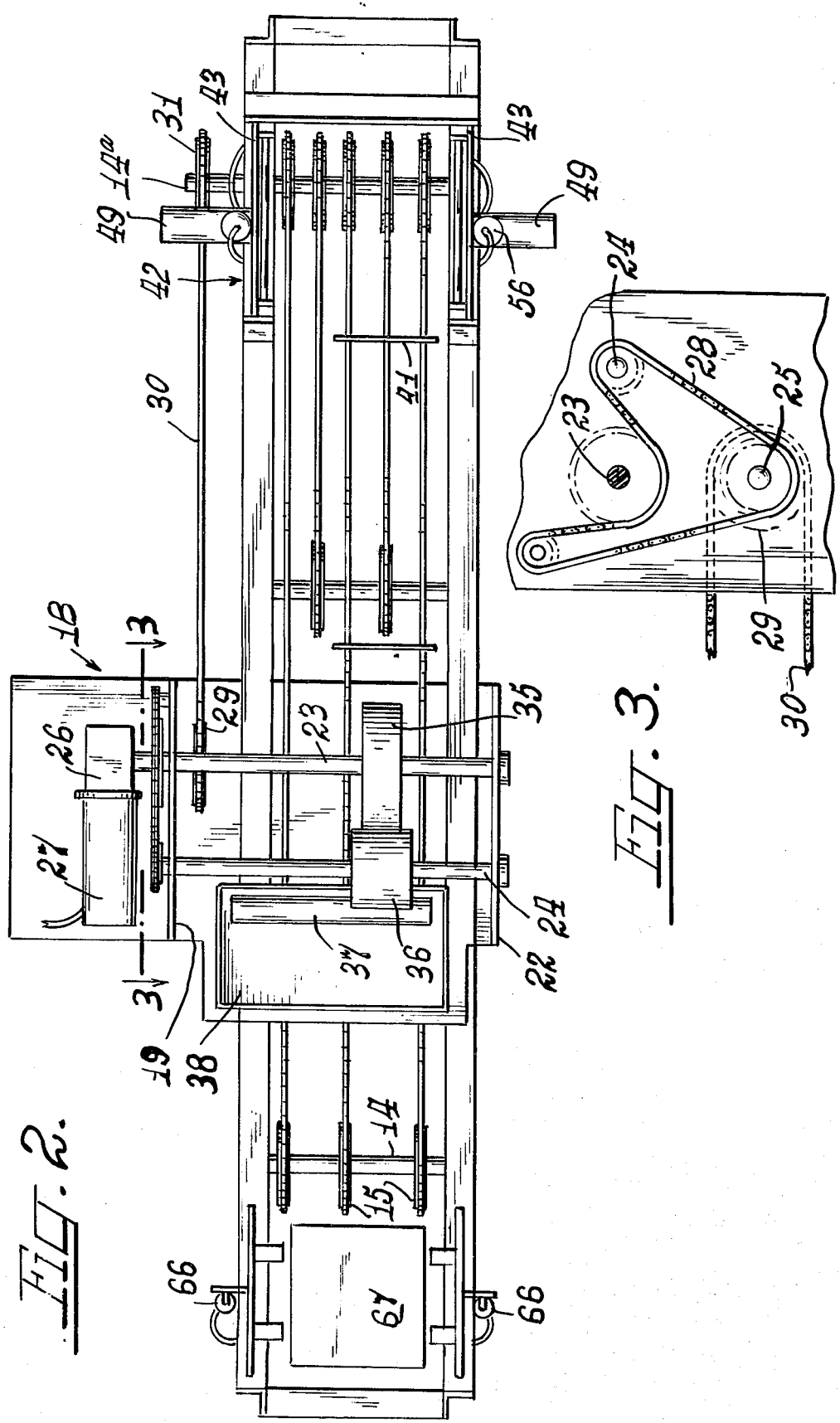

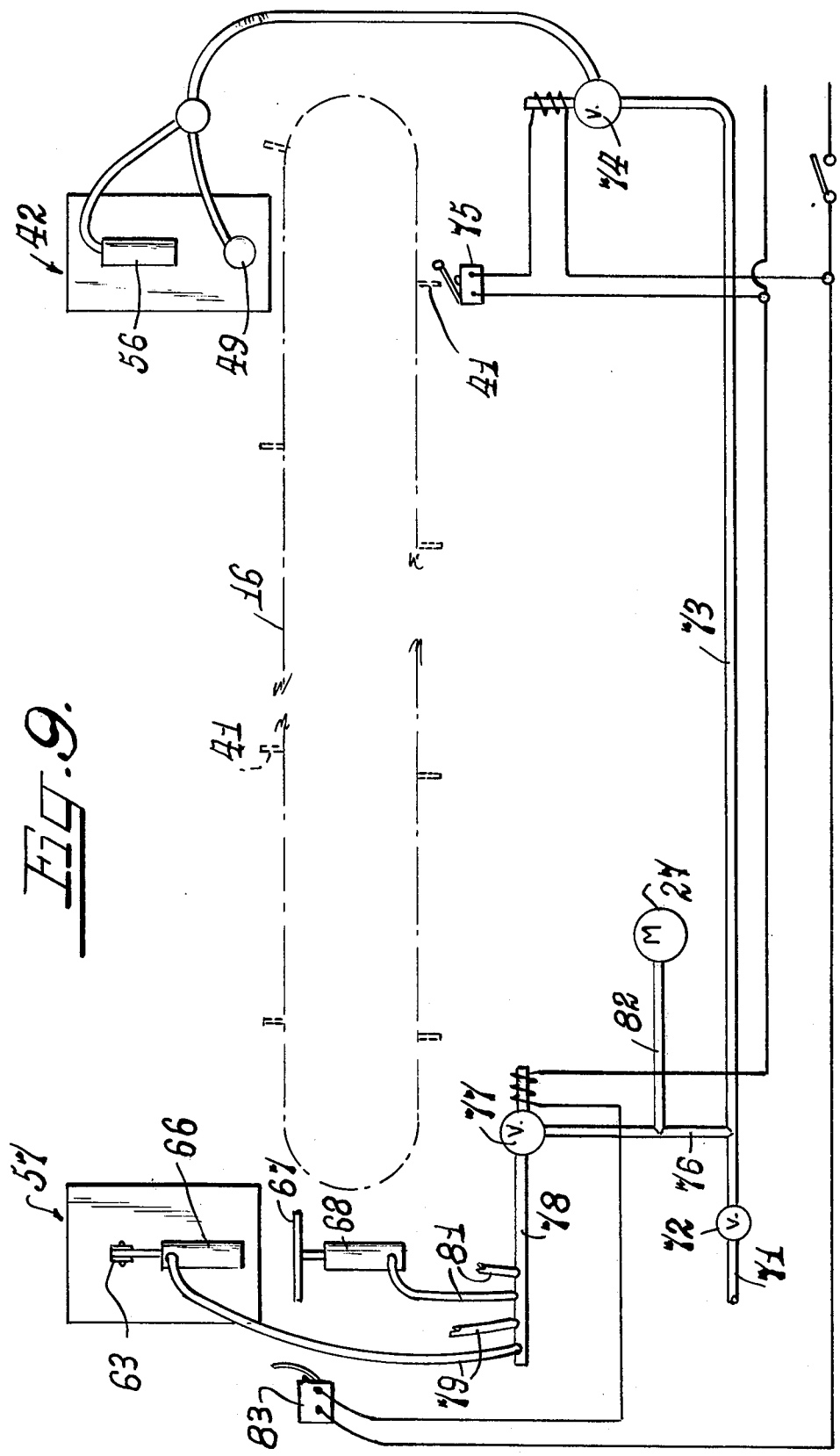

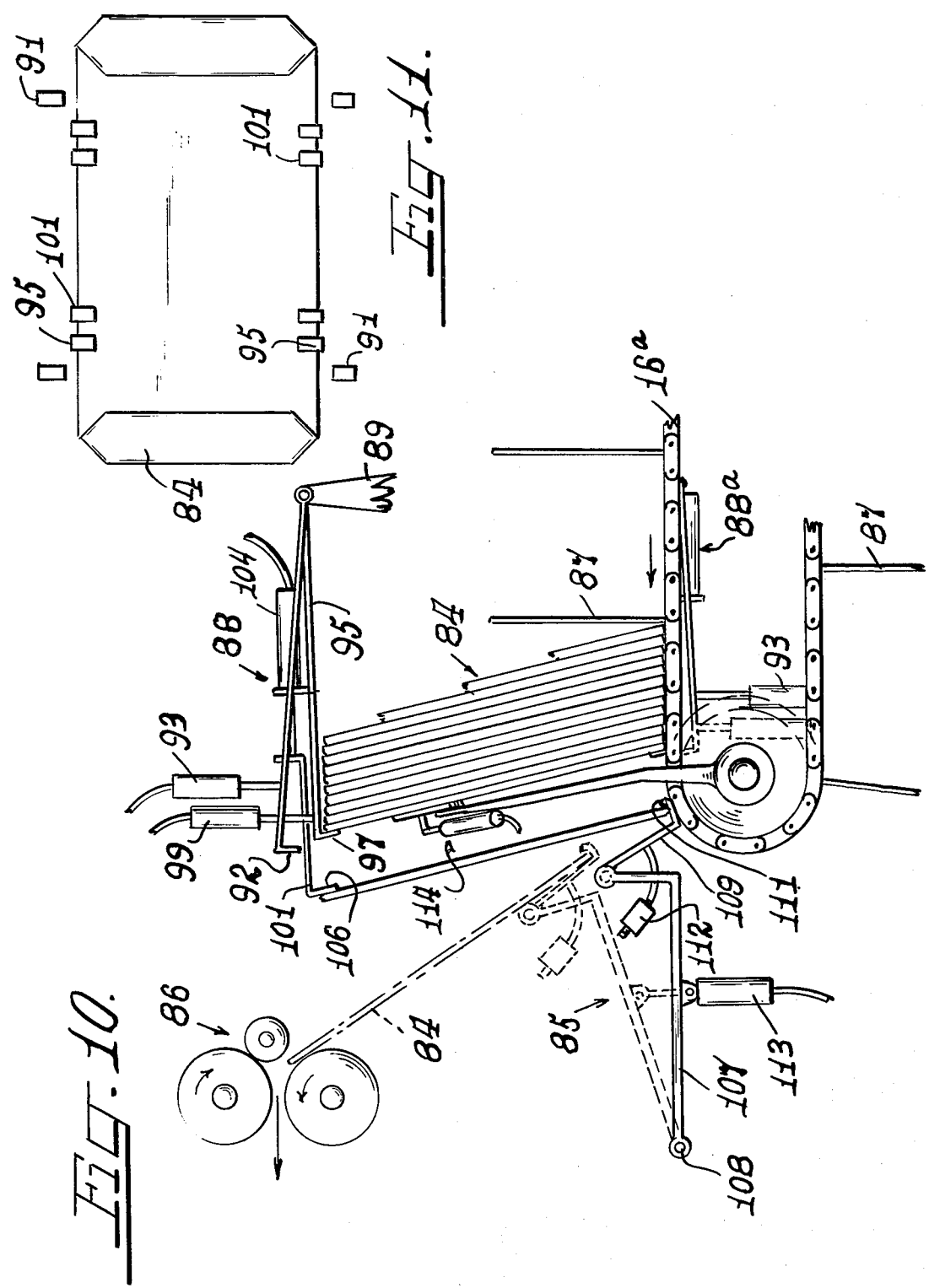

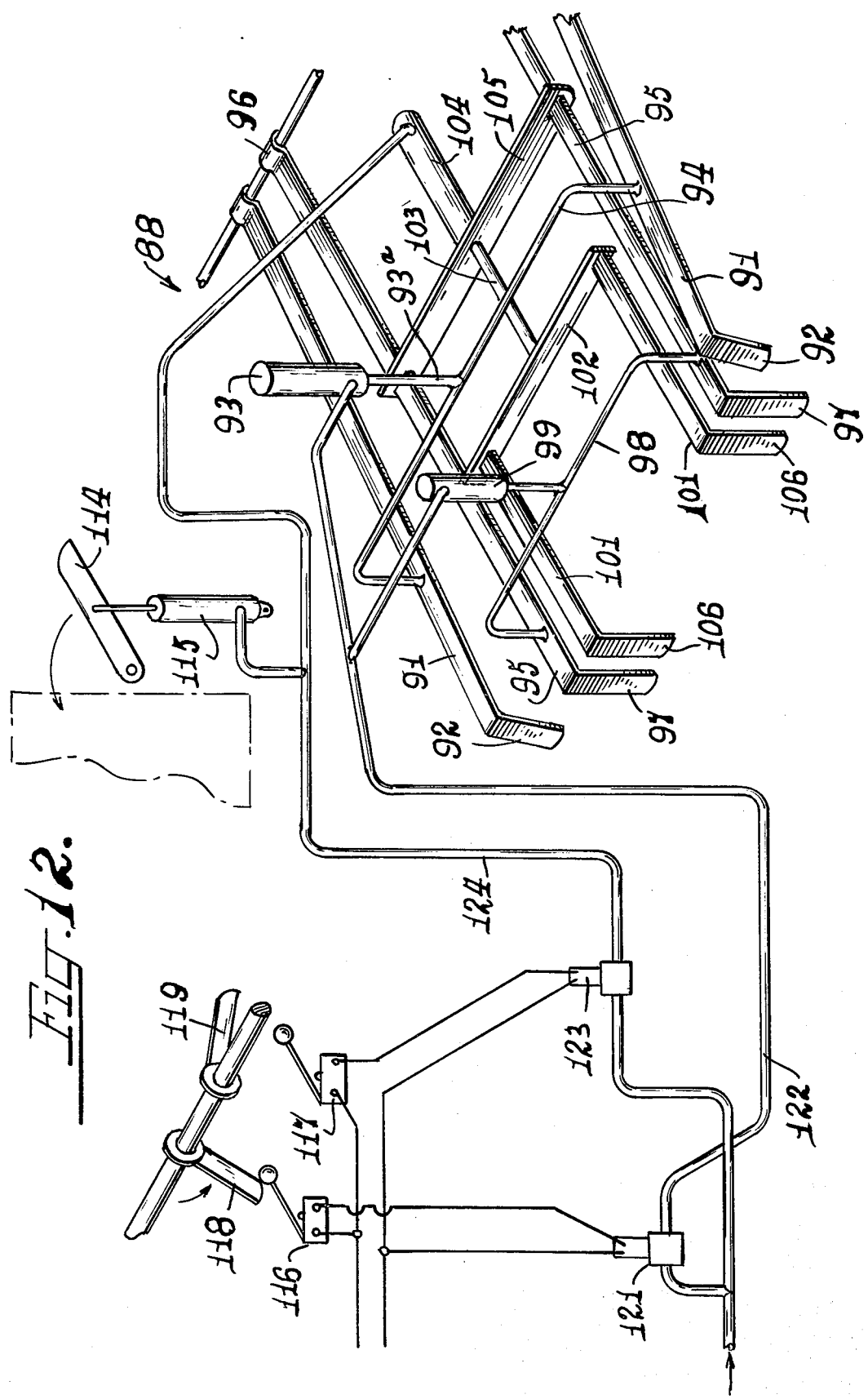

APPARATUS FOR FEEDING, PRINTING AND STACKING ARTICLES

The invention relates to improvements in printing apparatus and is particularly concerned with novel apparatus for imprinting indicia on such items as egg cartons or other articles, and wherein the cartons or other articles to be printed are fed automatically from a supply thereof onto conveyor means that conveys the cartons or articles one at a time, to printing mechanism which functions to print indicia on the article irrespective of its contour, and then to discharge stacking apparatus, associated with one embodiment thereof. The assembly includes automatic controls for actuating the various components thereof in timed sequence so that as long as the supply of cartons or other articles lasts, there is a continuous uninterrupted flow of articles through the assembly.

It is therefore an object of the invention to provide apparatus of the character referred to.

Another object is to provide novelly constructed mechanism for feeding articles from a stack of articles to conveyor means.

Another object is to provide novel means for imprinting on an article having an irregular configuration.

Another object is to provide novelly constructed article stacking mechanism.

Another object is to provide a combination apparatus including a plurality of operable mechanisms with novel control means effective to syncronize the operation of said mechanisms.

Another object is to provide novel means for selectively ejecting one of a stack or stream of articles from such stack or stream and delivering it to associated printing mechanism.

Another object is to provide apparatus of the character referred to which is not difficult or expensive to manufacture, and which is very efficient in use and inexpensive to operate.

Other objects and advantages of the invention will become apparent with reference to the following description and accompanying drawings.

IN THE DRAWINGS

FIG. 1 is a side elevational view of printing apparatus embodying the invention.

FIG. 1a is a detail view of the printing mechanism functioning to imprint on an egg carton.

FIG. 2 is a plan view of the apparatus shown in FIG. 1.

FIG. 3 is a detail view, taken substantially along line 3—3 of FIG. 2, showing the printing apparatus drive chain.

FIG. 9 is a schematic view of the electrical controls and air system employed in the apparatus.

FIG. 10 is a side elevational view of a bag or paperboard feed apparatus, showing the discharge end only.

FIG. 11 is an end elevational view of the FIG. 10 apparatus, illustrating the holding fingers in discharge position.

FIG. 12 is a perspective view of the holding fingers of the FIG. 10 apparatus, showing schematically, the controls therefor.

Figure 4:
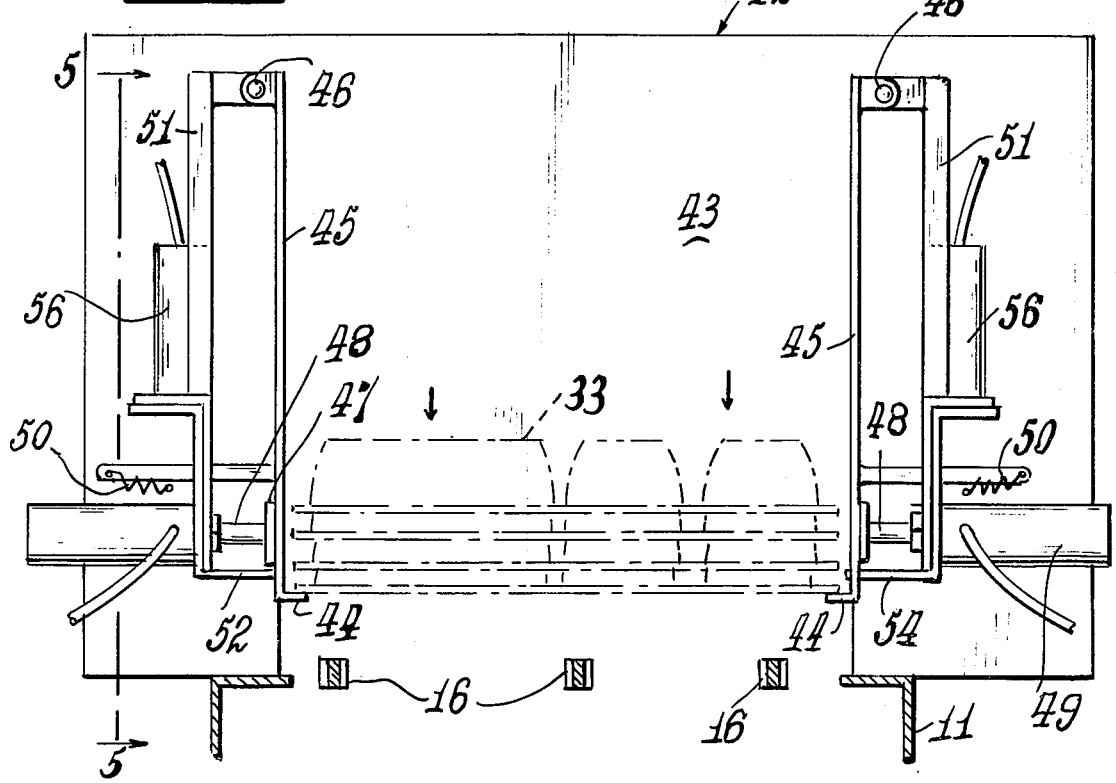
FIG. 4 is an end view of the article feeding mechanism, showing parts in stack holding position, as viewed substantially along line 4—4 of FIG. 1.

Referring to the exemplary embodiment of the invention illustrated in FIGS. 1 through 9 of the accompanying drawings, and with particular reference to FIGS. 1 and 2, the printing apparatus is carried on an elongated frame structure comprised of spaced apart side rails 11 and legs 12, preferably formed from angle irons. Suspended rigidly from each side rail, at each end of the frame, are supplemental rails 13 that terminate short of the longitudinal central region of the frame.

Mounted on axels 14–14a journalled between the frame rails 11 and 13, are three laterally spaced apart sprockets 15 over which are trained longitudinally extending endless chains 16 which constitute an endless conveyor. Suitable support sprockets 17 are carried on the innermost end of each supplemental rail 13, underlying the bottom reach of each of the chains 16.

Located substantially midway the length of the frame is a printing and drive mechanism assembly generally indicated at 18. This preferably comprises a support panel 19 upstanding from the rear end of and supported by a housing 21 which underlies the frame assembly and has on its forward end an upstanding wall 22 (partially broken away in FIG. 1). The panel 19 and wall 22 jointly provide bearing journals for three transverse shafts 23 and 24, which bridge the top of the frame, and a shaft 25. The shaft 23 is longer than shafts 24, 25 and it is journalled in a gear reduction box 26 carried on and connected with a drive motor 27 which in the present disclosure is air actuated but may of course be electrically driven if so desired.

Upon referring to FIG. 3, it will be observed that the shafts 24, 25 are connected, as by an endless chain 28, to the driven shaft 23 so as to be rotated in unison and at different given predetermined speeds. The shaft 25 carries, outside the frame (FIG. 2), a sprocket 29 over which is trained a chain 30 that is also trained over a sprocket 31 on shaft 14a. This affords a positive uniform drive for the conveyor chains 16.

Mounted on the shaft 25 is a quadrant 32 of such size as to cooperate with, for example, the egg carton 33 (FIG. 1a) in such manner as to support a surface 34 thereof upon which printed matter is to be applied. The driven shaft 23 mounts firmly, in vertical alignment with quadrant 32, a printing roller 35. Ink is applied to the printing roller through a contact roller 36 mounted firmly on shaft 24 which roller has in contact with it, an ink transfer roller 37 freely rotatable in an ink reservoir 38.

It might be noted at this time that the egg cartons illustrated are incrementally fed, in a manner to be described presently, onto the conveyor chains 16 in such manner that each is carried forward with the conveyor chains by being abutted by a transverse spacer bar 41 carried by at least two of said chains. These spacer bars 41 function further to control the timing sequence of apparatus operation all in a manner to be described presently.

Referring specifically to FIGS. 1 and 4–6, the cartons 33 to be fed into the apparatus are contained in a feed assembly 42 arranged at the delivery end of the apparatus (right hand end of FIG. 1). This assembly comprises upstanding walls 43 firmly secured one to each side rail 11 of the frame in any suitable manner and which mount means to selectively and intermittently deliver one carton at a time to the conveyor assembly 16. As best shown in FIG. 4, the cartons are arranged in a stack with the lowermost carton resting upon flanges 44 provided one of the lower end on each of a plurality of like fingers 45 suspended pivotally from pivots 46 at the upper end of walls 43. These fingers, which are three in number on each side, normally are in stack supporting position.

Figure 6:
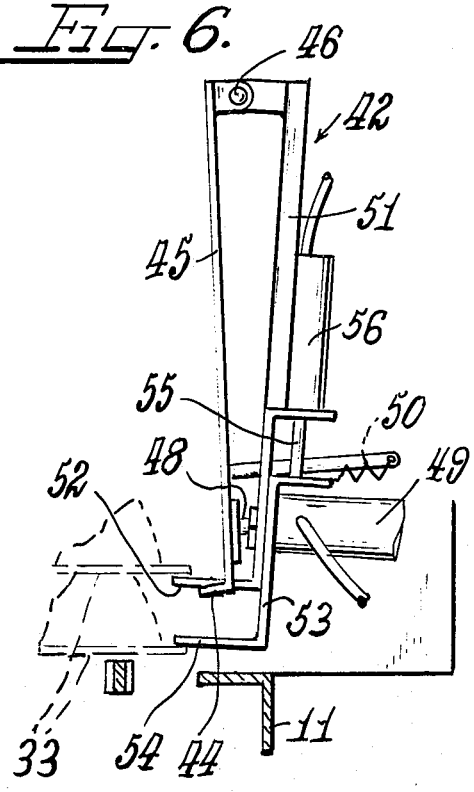
FIG. 6 is a detail view of the right hand end of FIG. 4, showing the fingers in a position for discharge of an article from the stack.

The fingers 45 in each set, are interconnected by a transverse bar 47 to which is attached the piston rod 48 of a piston-cylinder assembly 49. When air is admitted into the forward end of the cylinder, in a manner and by means to be described presently, the flanges 44 on each finger 45 are withdrawn from beneath the stack, as illustrated in FIG. 6, so that the lowermost carton 33 is free to fall down onto conveyor 16 and be delivered to the printing mechanism. When air pressure in cylinder-assembly 49 is relieved a spring 50 returns the fingers 45 to their initial position.

However, it has been experienced that in many instances the freed carton will not fall free by its own weight. Consequently, means is provided, not only to hold the remaining cartons in the stack elevated, but to also positively force the freed carton downwardly away from the stack. For the purpose of holding the balance of the stack elevated, there is provided in the feed assembly 42, a second set of fingers 51, pivoted also at 46 to the walls, each having a flange 52 on its bottom end which normally is withdrawn from beneath the stack as shown in FIG. 4. However, when compressed air is admitted into the cylinders 49 withdrawing the flanges 44 from beneath the bottom carton, said cylinders, being carried firmly by fingers 51, will react in a direction opposed to the direction of movement of its associated piston rod 48, and carry the fingers 51 forwardly to locate their flanges 52 between the first and second cartons (FIG. 6) thus supporting the second carton when the first or lower carton is discharged.

Figure 5:
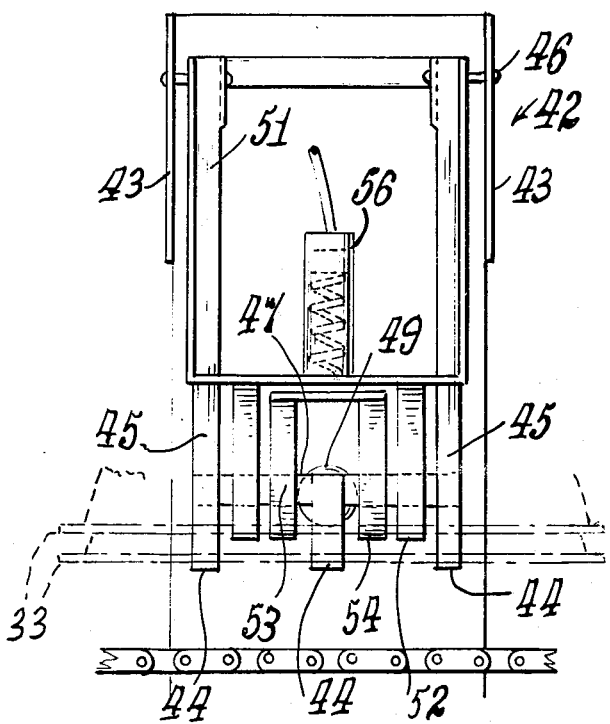
FIG. 5 is a side elevational view of the feeding mechanism, viewed substantially along line 5—5 of FIG. 4.

Now, with the stack supported by the flanges 52, means is now actuated to positively force the bottom or released carton from the stack. This means, also illustrated in FIGS. 4-6 is comprised of a pair of fingers 53 on each side of the stack, each of which has a flange 54 to enter between the bottom and the next succeeding carton when actuated. As shown, these fingers are connected to the piston rod 55 of a piston-cylinder assembly 56 mounted firmly on the finger 51 assembly. When compressed air is admitted into the upper end of cylinder 56, the fingers, which have their flanges 54 entered between the two lower cartons by reason of inward movement of the stack supporting fingers 51, are pushed downwardly, as best shown in FIG. 6, to forcibly urge the bottom carton down onto the conveyor 16.

From the foregoing it will be evident that a stack of cartons may always be maintained in the feed assembly 42 and that each carton is successively discharged at periodic intervals onto the conveyor. The electrical controls and air line system will be described presently.

Figure 7:
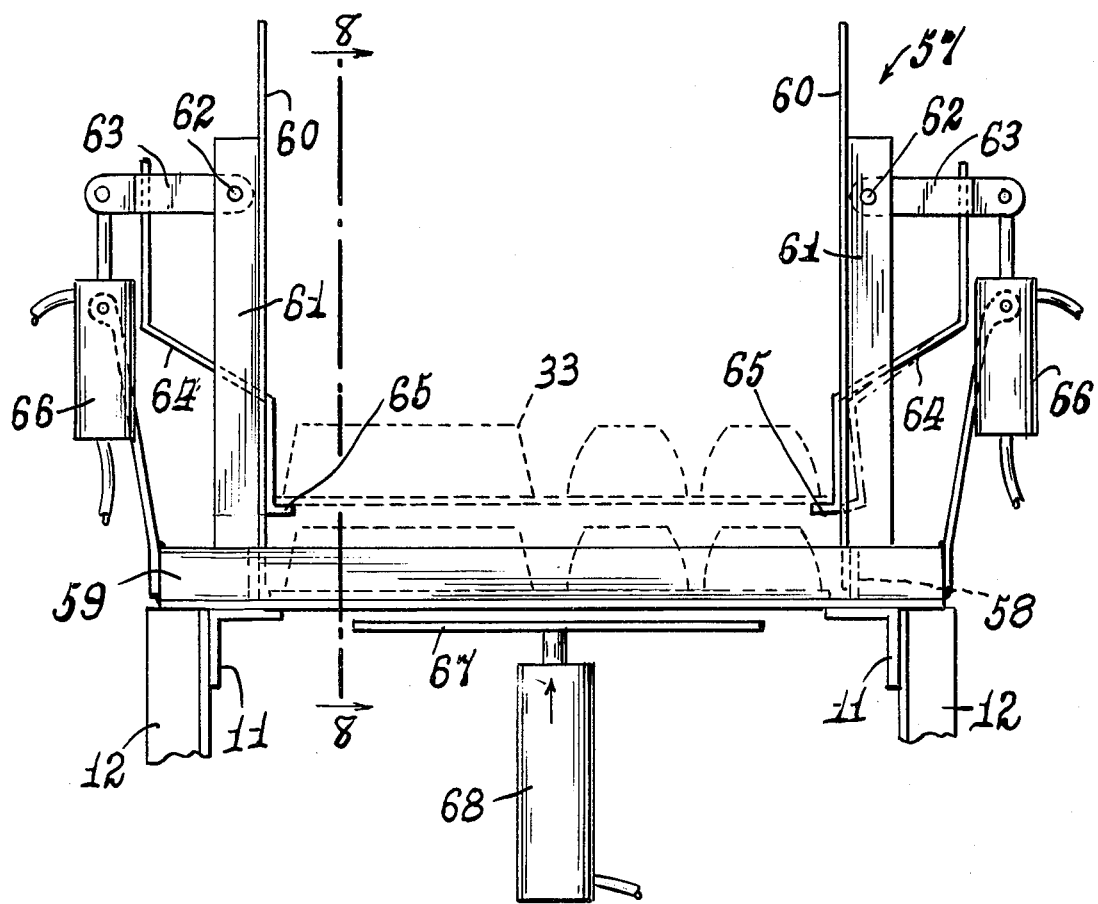
FIG. 7 is a transverse elevational view of the stacker mechanism at the discharge end of the apparatus.
Figure 8:
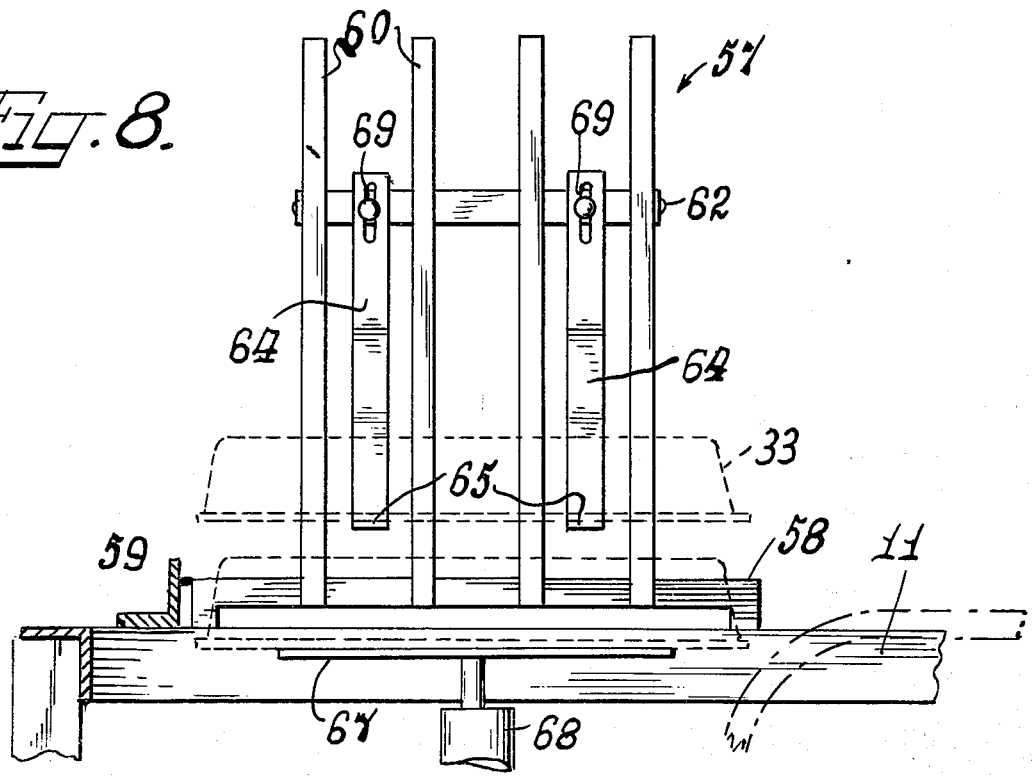
FIG. 8 is an elevational view of the mechanism as viewed along line 8—8 of FIG. 7.

After the cartons have advanced through the printing mechanism 32–35, where they are printed upon, they continue to advance along with the conveyor chains 16 until they reach the discharge end (left hand end in FIG. 1) where they are stacked. The stacker 57 is best shown in FIGS. 7–8, to which reference is now had.

Mounted on each side rail 11 of the frame is base member 58 suitable connected at one end by a lateral angle bar 59 for rigidity. Each member 58 has upstanding posts 60 spaced apart in a longitudinal direction relative to the conveyor 16. The two end posts 60 have stiffening flanges 61 provided, at their upper ends, with bearings to receive pivotal pins 62 for mounting arms 63 thereon. Each arm 63 carries, rigidly, a finger 64 that extends downwardly and then inwardly so as to locate a flange 65 on its lower end beneath the margin of a stack of printed cartons 33. A piston-cylinder assembly 66, connected to each arm 63, functions to swing the fingers 64 inwardly or outwardly as indicated in dotted lines in FIG. 7, for a purpose now to be described. When a carton drops off the end of the conveyor chains 16, it falls onto an elevator plate 67 which is in the lowered position shown. As soon as the carton falls onto the plate 67, electrical means is actuated to cause pressurized air to flow into an elevator piston-cylinder assembly 68 to thereby cause the elevator plate and carton thereon to be elevated. At the same time, air is admitted into the piston-cylinder assemblies 66 to cause the stack support fingers 64 to move out from beneath the stack. The just elevated carton will now nest into the bottom of the stack and as soon as the elevator plate starts to return to its lower position, the fingers 64 move inwardly to locate their flanges 65 in stack supporting position. The fingers 64 preferably are vertically adjustable, by providing screw-slot connections 69 with their arms 62.

Coordinated operation of the various components of the carton printing apparatus is effected through use of an electrical control system for controlling the opening and closing of valves in the lines supplying pressurized air to the various piston-cylinder assemblies. This is best illustrated schematically in FIG. 9. As there shown, there is a common pressurized air line 71, including an on-off valve 72. The line 71 has a branch 73 leading to a solenoid valve 74 that has a branched conduit connected to each of the piston-cylinder assemblies 49 and 56. This normally closed valve is controlled by a micro-switch 75 arranged in the path of the lateral bars 41 on the conveyor chains 16. Thus, each time a bar 41 passes over and actuates switch 75, the carton feed mechanism 42 is actuated to drop a carton on the conveyor chains 16.

The air line 71 also has a branch 76 leading to a solenoid valve 77 having a manifold 78 from which a plurality of flow lines 79–81 lead. The lines 79 lead to the stack support finger actuating piston-cylinder assembly 66 and the flow lines 81 lead to the piston-cylinder assembly 68 operable to raise and lower the elevator plate 67.

A branch line 82 leads from line 76 to the motor 27 which operates at all times, when valve 72 is open, to advance the conveyor chains. Opening and closing of the solenoid valve 77 is controlled by a micro-switch 83 so positioned with relation to the elevator plate 67 as to be struck by a carton when the latter is advanced into position on said plate. When the article being elevated moves past switch 83 said switch opens to de-energize solenoid valve 77 allowing the elevator to return to its lowered position and causing stack support fingers 65 to engage beneath the stack. It should be evident that the operation of the printing mechanism is entirely automatic and will function so long as pressurized air is admitted to the various components thereof.

The embodiment illustrated in FIGS. 10 through 13 depicts a modified structure wherein the articles to be printed are conveyed along a horizontal conveyor 16a in a substantially vertical position and are fed one at a time to associated printing equipment (not shown) located at the discharge end of the conveyor. These articles may be sheets of pressboard, corrugated box board or bags 84. In either event they are sequentially engaged at the discharge end of the conveyor by finger apparatus which functions in a manner, similar to the feed apparatus shown at the right hand end of FIG. 1, but which in this instance is disposed in a horizontal plane. In each instance of a released article, the article is advanced mechanically ahead of the advancing stack of articles and is picked up by elevator mechanism 85 which carries it into position to be engaged by associated feed rollers 86 and delivered to the printing apparatus.

More particularly, referring specifically to FIG. 10, the articles 84 are arranged in vertical position on an incrementally advanced conveyor 16a but which, in this instance, is provided with upstanding spacer rods or bars 87 to hold the articles upright and insure their advance with the conveyor. Adjacent to the discharge end of the conveyor there is arranged two sets of feed assemblies 88 and 88a operably connected to operate in conjunction one with the other. As these assemblies are identical, except for the fact that one is arranged above the advancing articles and the other below said articles, the following description will apply to each and like numerals will identify corresponding parts. As will be explained hereinafter these assemblies function to separate the lead article 84 from the advancing stack of articles and advance it at an increased rate of speed so as to carry its bottom edge off of the conveyor and into a rest position on the elevator mechanism 85.

Referring now specifically to the like feed assemblies 88–88a, the upper one of which is best shown in FIG. 12, said assembly is supported by any suitable frame structure 89 bridging the conveyor and its contents, in a horizontal position spaced just above the top edge of the articles. In order to accommodate articles of different height the frame structure 89 may be vertically adjustable. Basically, the feed assembly is like the one disclosed in FIGS. 4–6 except as to position and some details of structure. Specifically, it includes a pair of arms 91, pivotally mounted on the frame structure at one of its ends, as at 96, and having a downwardly turned end portion 92 that normally lies in the path of the advancing articles. During sequential operation of the said arm 91 it is raised to clear its end portion 92 from the path of the articles so that the lead article is unimpeded. Such movement of the arm 91 is accomplished by operation of an air controlled cylinder-piston assembly 93 having its piston rod 93a connected firmly to a bridge 94 connecting the two arms 91 for movement in unison.

As noted hereinabfore, the feed mechanism includes means to prevent the following articles from advancing along with the freed article. Such means is also comprised of a pair of arms 95 that are also hingedly connected at 96 to the support frame 89 and has at their other or free ends downwardly turned portions 97 disposed to enter between the lead article and the next succeeding article to hold the latter when the lead article is advanced. Movement of arms 95 into and out of article engagement is coordinated by a connecting bridge 98 to which is operably connected a piston-cylinder assembly 99.

It frequently occurs that the lead article 84 tends to adhere to the following article because of friction, adhesion or suction. To overcome this and to insure rapid advance of the released lead article, a separator or pusher in the form of a third pair of arms 101 is provided. These arms are carried rigidly at one end of a tie bar 102 to which is connected the piston rod 103 of a cylinder-piston assembly 104. This assembly 104 is mounted firmly on a cross bar 105 bridging the arms 95 so as to be movable therewith. The free ends of the arms 101 also have a turned portion 106 which is carried into the space between the lead article and the following articles. When the arms 91 are lifted free of the lead article the piston-cylinder assembly 104 is actuated to push the arms 101 forward (toward the discharge end) so as to push the lead article 84 off the end of the conveyor and onto the elevator mechanism 85.

Referring again to FIG. 10, the elevator mechanism 85 comprises a vertically oscillatable frame 107 pivoted at 108 and having on its free end a pair of laterally spaced brackets 109 (one shown) each having an article supporting flange 111. These brackets are freely pivotal and each carries a counter weight 112 for the purpose of urging the flanges 111 toward the advancing article 84 to insure its engagement beneath the lower edge thereof. Thus, when the lead article rests on the flanges 111, a piston-cylinder combination 113 is actuated to raise the frame 107 and carry the supported article upwardly so that it can be engaged between the constantly driven feed rollers 86 for delivery to adjacent printing apparatus (not shown).

There may be instances as when bags are being fed along the conveyor that they tend to adhere one to the other because of the presence on their surface of some of the adhesive used in bag construction, or because of adhesion. Such instance may require special means to effect their separation and to this end a sweeper arm 114 is arranged on each side of the conveyor, about midway the height of the advancing bags, which is actuated by piston-cylinder means 115 to sweep between the lead bag and the one immediately following same at the time of forcible separation of the lead bag.

An exemplary system of control and synchronized operation of the various components is best illustrated schematically in FIG. 12. This consists of a pair of micro-switches 116 and 117 arranged on the side of the conveyor assembly having associated cam elements 118 and 119. The micro-switch 116 is electrically connected to a solenoid valve 121 connected in a compressed air line 122, and having flow connection through a common conduit with piston-cylinder assemblies 93 and 99. When compressed air is admitted into assembly 93 its piston is drawn into the cylinder so as to withdraw the fingers on arms 91 away from the lead article, whereas; when air is admitted into the cylinder 99, the arms 95 and their fingers 97 are projected between the first and second article. When pressure is relieved, springs within the cylinders return the parts to their initial positions. Of course, when the arms 95 are in their engaging position, the arms 101 are also in an in position between the two adjacent lead articles. Now, cam 119 actuates the switch 117 to open a valve 123 in the air line 124 so as to admit pressurized air into the piston-cylinder assembly 104 to actuate the pusher fingers 101 to separate the lead article as recited hereinabove. At the same time, if the sweeper 114 is employed, it is actuated through its piston-cylinder assembly 115.

Although I have described preferred embodiments of my invention, in considerable detail, it will be understood that the description thereof is intended to be illustrative rather than restrictive, as details of the structures may be modified or changed without departing from the spirit or scope of the invention. Accordingly, I do not desire to be restricted to the exact constructions described and shown.

I claim:

1. Apparatus for imprinting indicia on articles comprising, in combination, conveyor means, means to deliver articles one at a time onto said conveyor, printing apparatus associated with said conveyor, drive means for said conveyor to advance said articles toward and past said printing apparatus, and means to receive printed articles discharged from the conveyor, wherein the means to deliver articles onto the conveyor comprises first movable means normally engaging beneath the bottom article in a stack of articles to hold the stack elevated above the conveyor, second movable means normally disengaged from the stack, a pneumatic cylinder carried by the second movable means and a piston rod operable in said cylinder and connected to said first movable means for withdrawing the first movable means out from beneath the stack and advancing the second movable means into position between the first and second articles in the stack, third movable means carried by the second movable means engageable between the first and second articles in the stack, and pneumatically actuated means carried by the second movable means operable to urge the third movable means downwardly to release the bottom article from the stack.

2. The apparatus recited in claim 1, wherein the means to hold and discharge articles onto the conveyor comprises a plurality of fingers selectively operable to support, release and positively discharge one article at a time from a stack of articles.

3. The apparatus recited in claim 1, wherein the printing apparatus comprises a back up quadrant engageable beneath the article and a printing roller above said article.

4. Apparatus for imprinting indicia on articles comprising, in combination, conveyor means, means to deliver articles one at a time onto said conveyor, printing apparatus associated with said conveyor, and drive means for said conveyor to advance said article toward and past said printing apparatus, wherein the means to deliver articles onto the conveyor comprises first movable means normally engaging beneath the bottom of the stack to hold it elevated, second movable means normally disengaged from the stack, a pneumatic cylinder carried by the second movable means and a piston rod operable in said cylinder and connected to the first movable means for withdrawing the first movable means out from beneath the stack and advancing the second movable means beneath the next succeeding article in the stack, and pneumatically actuated means operable to urge the released bottom article downwardly onto said conveyor means.

5. The apparatus recited in claim 3, wherein spring means is provided to return the first and second movable means to their initial position when the pneumatic cylinder is relieved.

6. Apparatus for imprinting indicia on articles comprising, in combination, conveyor means, means to deliver articles one at a time onto said conveyor, printing apparatus associated with said conveyor, drive means for said conveyor to advance said articles toward and past said printing apparatus, and means to receive and stack printed articles discharged from the conveyor, wherein the means to deliver articles onto the conveyor comprises first movable means normally engaging beneath the bottom article in a stack of articles to hold the stack elevated above the conveyor, second movable means normally disengaged from the stack, a pneumatic cylinder carried by the second movable means and a piston rod operable in said cylinder and connected to said first means for withdrawing the first movable means out from beneath the stack and for advancing the second movable means into position between the first and second articles in the stack, third movable means carried by the second movable means engageable between the first and second articles in the stack, and pneumatically actuated means carried by the second movable means operable to urge the third movable means downwardly to release the bottom article from the stack.

7. The apparatus recited in claim 6, wherein the means to receive and stack the printed articles comprises means actuated by pressurized air to locate a newly discharged article on the bottom of the stack.

8. The apparatus recited in claim 6, wherein the means to receive and stack the printed articles comprises means to support the stack above a said article and means to raise said article into contact with the bottom of the stack.

* * * * *

UNITED STATES PATENT OFFICE
CERTIFICATE OF CORRECTION

Patent No. 3,895,574                Dated July 22, 1975

Inventor(s) Ralph A. Nyborg

It is certified that error appears in the above-identified patent and that said Letters Patent are hereby corrected as shown below:

Column 5, line 41, after the word "said" the word -- upper -- should be inserted.

Signed and Sealed this seventh Day of October 1975

[SEAL]

Attest:

RUTH C. MASON
*Attesting Officer*

C. MARSHALL DANN
*Commissioner of Patents and Trademarks*